(12) United States Patent
Wajs

(10) Patent No.: US 8,165,293 B2
(45) Date of Patent: Apr. 24, 2012

(54) METHOD AND SYSTEM PROVIDING SCRAMBLED CONTENT

(75) Inventor: Andrew Augustine Wajs, Haarlem (NL)

(73) Assignee: Irdeto Access B.V. (NL)

( * ) Notice: Subject to any disclaimer, the term of this patent is extended or adjusted under 35 U.S.C. 154(b) by 934 days.

(21) Appl. No.: 11/706,747

(22) Filed: Feb. 14, 2007

(65) Prior Publication Data

US 2007/0189525 A1    Aug. 16, 2007

(30) Foreign Application Priority Data

Feb. 15, 2006  (EP) ..................................... 06101704

(51) Int. Cl.
*H04N 7/167* (2011.01)
(52) U.S. Cl. ............. 380/239; 380/28; 380/42; 380/228; 386/255; 725/31; 348/569
(58) Field of Classification Search .................. 380/239, 380/42, 228, 28; 348/E7.056
See application file for complete search history.

(56) References Cited

U.S. PATENT DOCUMENTS

| | | | |
|---|---|---|---|
| 7,050,588 B1 * | 5/2006 | Wajs et al. ..................... | 380/269 |
| 7,116,892 B2 * | 10/2006 | Wajs .............................. | 386/94 |
| 7,336,789 B1 * | 2/2008 | Mooij et al. .................. | 380/255 |
| 7,552,457 B2 * | 6/2009 | Van De Ven et al. ........... | 725/31 |
| 7,593,529 B1 * | 9/2009 | Yang .............................. | 380/200 |
| 2001/0036271 A1 | 11/2001 | Javed | |
| 2002/0120928 A1 * | 8/2002 | Wajs .............................. | 725/25 |
| 2002/0184506 A1 * | 12/2002 | Perlman ........................ | 713/182 |
| 2002/0194613 A1 * | 12/2002 | Unger ............................ | 725/118 |
| 2003/0152364 A1 * | 8/2003 | Wajs .............................. | 386/68 |
| 2003/0159140 A1 * | 8/2003 | Candelore ...................... | 725/31 |
| 2003/0174837 A1 * | 9/2003 | Candelore et al. ............. | 380/210 |
| 2003/0237089 A1 * | 12/2003 | Wajs .............................. | 725/31 |
| 2004/0082286 A1 | 4/2004 | Liu | |
| 2005/0094809 A1 | 5/2005 | Pedlow et al. | |
| 2005/0198680 A1 * | 9/2005 | Baran et al. .................... | 725/88 |

FOREIGN PATENT DOCUMENTS

| | | |
|---|---|---|
| EP | 1063647 A2 * | 12/2000 |
| EP | 1499062 | 1/2005 |

OTHER PUBLICATIONS

Digital Video Broadcasting (DVB); Support for use of scrambling and Conditional Access (CA) within digital broadcasting systems. ETSI, ETSI Techinical Report 289, Oct. 1996. (see pdf attachment named etr_289e01p).*
"European Search Report for Application No. EP 06 10 0714" (Aug. 28, 2006).

* cited by examiner

*Primary Examiner* — Ashok B. Patel
*Assistant Examiner* — Brian Shaw
(74) *Attorney, Agent, or Firm* — Schwegman, Lundberg & Woessner, P.A.

(57) ABSTRACT

A method of providing a stream of data units with scrambling state identifying data and providing a stream of key messages, synchronized with the stream of data units. The scrambling state identifying data includes an identifier value associated with the first decryption key that associates the data units in a third section. Then separating the first and second sections, with scrambling state identifying data lacking an identifier value associated with the decryption key, and providing in a key message coinciding with first or third sections key information. Thereby enabling an authorized decoder to obtain a value of the first decryption key corresponding with the second value of the first encryption key. Encryption of at least part of the clear data units uses the first encryption key is suspended for each data unit in the sequence included in the third section.

9 Claims, 4 Drawing Sheets

METHOD AND SYSTEM PROVIDING SCRAMBLED CONTENT

CLAIM OF PRIORITY

The present patent application claims the priority benefit of the filing date of European Application (EPO) No. 06101704.2 filed Feb. 15, 2006, the entire content of which is incorporated herein by reference.

BRIEF DESCRIPTION OF THE DRAWINGS

Example embodiments will now be explained in further detail with reference to the accompanying drawings, in which.

DETAILED DESCRIPTION

Figure 1:
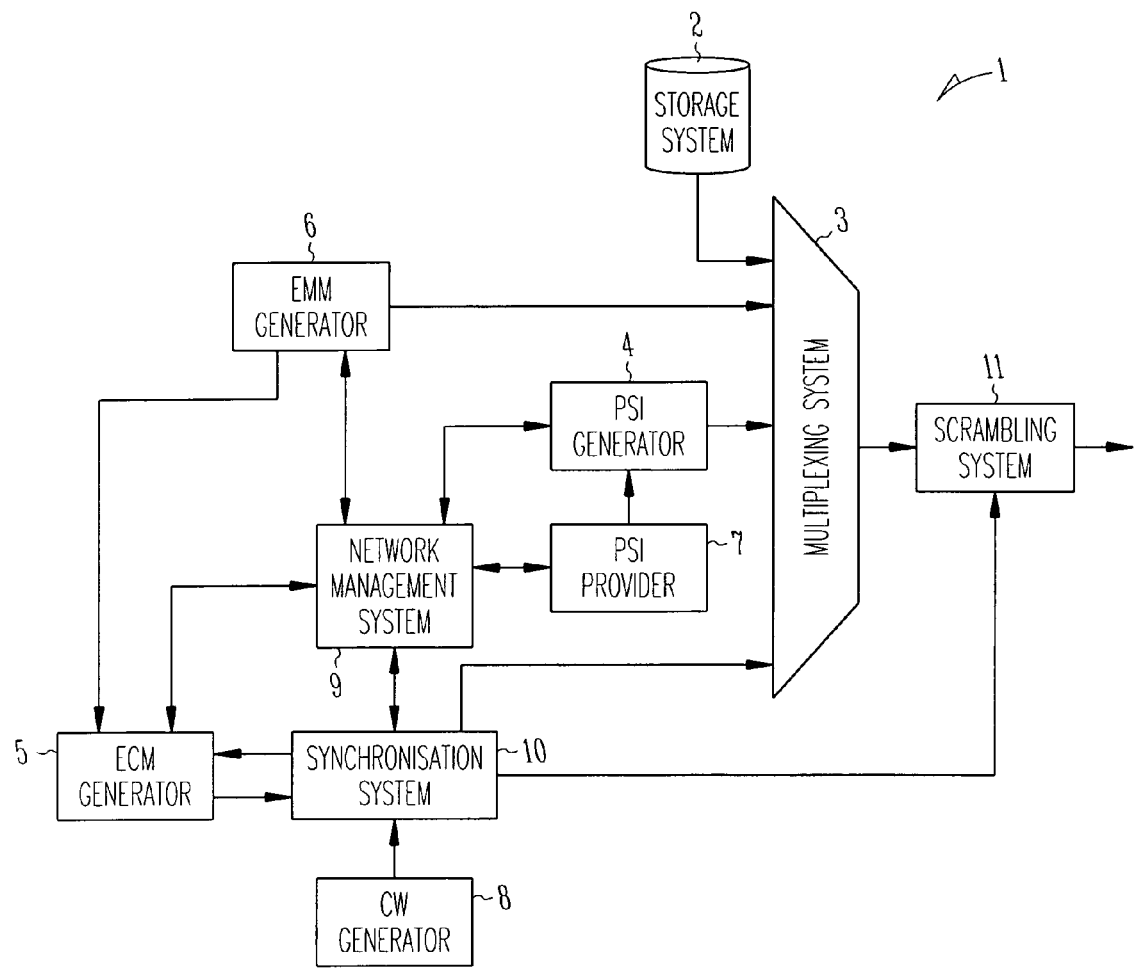
FIG. 1 is a diagram showing a head-end from which to provide scrambled data in schematic fashion.

An example embodiment relates to a method of providing scrambled data, including providing a stream of data units based on a sequence of clear data units by at least subjecting at least part of at least some of the clear data units to a cryptographic operation employing a first encryption key which forms a key pair with a corresponding first decryption key, such that a first section of the stream of data units includes data units including cryptograms obtained using a first value of the first encryption key, and such that a second section includes data units including cryptograms obtained using a second value of the first encryption key, and by associating data units with scrambling state identifying data for indicating a state of scrambling applicable to the associated data unit, which method further includes providing a stream of key messages, each carrying at least key information enabling an authorised decoder to obtain a value of the first decryption key, the stream of key messages and stream of data units being synchronised, associating each data unit including a cryptogram obtained using any value of the first encryption key with scrambling state identifying data including an identifier value associated with the first decryption key, associating data units in a third section, separating the first and second sections, with scrambling state identifying data lacking an identifier value associated with the first decryption key, and providing in at least one key message coinciding with one of the first and third sections key information enabling an authorised decoder to obtain a value of the first decryption key corresponding with the second value of the first encryption key.

An example embodiment further relates to a system for providing scrambled data, including an input for receiving a stream of clear data, an output for providing a stream of data units based on the clear data, at least a first cryptographic system for applying a cryptographic operation employing a first encryption key forming a key pair with a corresponding first decryption key to at least part of a data unit, a control system for providing at least some data units in a first section of the stream of clear data for inclusion in a first section of the stream of data units to the first cryptographic system with a first value of the first encryption key, and for providing at least some data units in a second section of the stream of clear data for inclusion in a second section of the stream of data units to the first cryptographic system with a second value of the first encryption key, a system for providing a stream of key messages carrying key information enabling an authorised decoder to obtain values of the first decryption key, and a system for synchronising provision of the stream of key messages and of the stream of data units to an authorised decoder, wherein the system is arranged to associate scrambling state identifying data including an identifier value associated with the first decryption key with each data unit obtained by applying the cryptographic operation employing the first encryption key, to associate data units in a third section of the stream of data units separating the first and second section with scrambling state identifying data lacking an identifier value associated with the first decryption key, and to include in the stream of key messages at least one key message coinciding with one of the first and third sections and carrying key information enabling an authorised decoder to obtain the second value of the first decryption key.

An example embodiment further relates to a method of decoding scrambled data, including obtaining a stream of data units associated with scrambling state identifying data for indicating a state of scrambling applicable to the associated data unit, obtaining a stream of key messages in synchronisation with the stream of data units, causing consecutive values of a first decryption key to be generated from respective sets of key information in at least some of the key messages in the stream of key messages, and subjecting at least a part of any data unit associated with scrambling state identifying data including a first identifier value to a cryptographic operation employing the first decryption key, wherein a value of the first decryption key maintained as a current value is applied.

An example embodiment further relates to a system for decoding scrambled data, including an interface for obtaining a stream of data units associated with scrambling state identifying data for indicating a state of scrambling applicable to the associated data unit, and for obtaining a stream of key messages synchronously with the stream of data units, wherein the system is arranged to obtain consecutive values of a first decryption key from respective sets of key information in at least some of the key messages in the stream of key messages, and wherein the system is further arranged to apply a decryption operation to at least parts of data units associated with scrambling state identifying data including a first identifier value using the first decryption key, wherein a value of the first decryption key maintained as a current value is applied.

An example embodiment further relates to a computer program.

Respective examples of such methods and systems are known from "Digital Video Broadcasting (DVB); Support for use of scrambling and Conditional Access (CA) with digital broadcasting systems", ETSI Technical Report ETR 289, October 1996. That technical report addresses the addition of Conditional Access (CA) elements to international standard ISO/IEC 13818-1 (MPEG-2). The scrambling algorithm operates on the payload of a Transport Stream (TS) packet in the case of TS-level scrambling. A structuring of PES packets is used to implement PES-level scrambling with the same scrambling algorithm. The Program Specific Information (PSI) part of the MPEG-2 specification contains syntactical elements defining where to find CA system information. The CA table and the Program Map Table (PMT) contain CA descriptors which have a CA_PID field to reference PID values of TS packets that are used to carry CA information such as EMMs (Entitlement Management Messages) and ECMs (Entitlement Control Messages). For applications that scramble MPEG-2 Sections, the scrambling of Sections is at the TS level and signalled by scrambling control field bits. The MPEG-2 Systems specification contains a scrambling control field of two bits, both in the TS packets header and the in the PES (Program Elementary Stream) header. The first scrambling control bit indicates whether or not the payload is scrambled. The second bit indicates the use of Even or Odd Key.

One problem is that it is necessary to use two bits in order to cycle the control word, i.e. the key, used in the Common Scrambling Algorithm. This is the case, because the time needed to load a new control word in the decoder cannot be determined precisely and varies from decoder to decoder, and because the decoder needs to know when to start using a new control word. Thus, it is necessary to signal three states, namely odd control word, even control word and not scrambled.

An example embodiment seeks to provide methods and systems of the types mentioned above for implementing a more efficient way of synchronising key changes.

An example method of providing scrambled content according to an example embodiment, includes suspending subjection of at least part of the clear data units to the cryptographic operation employing the first encryption key for each data unit in the sequence included in the third section.

It is observed that, where a symmetric algorithm is employed, the first decryption key and the corresponding first encryption key with which it forms a key pair will be identical in value.

Because a third section separates the first and second sections and subjection to the cryptographic operation employing the first key is suspended for each data unit in the sequence included in the third section, there is a certain "quiet period" during which the second value of the first key can be loaded. Because each data unit including a cryptogram obtained using any value of the first encryption key is associated with scrambling state identifying data including an identifier value associated with the first decryption key, it is only necessary to be able to indicate a second state in connection with the algorithm using the first encryption key, namely the state pertaining to the data units in the third section. Because the stream of key messages and stream of data units are synchronised, and because at least one key message coinciding with one of the first and third sections carries key information enabling an authorised decoder to obtain the second value of the first decryption key, a decoder is able to obtain the second value before the second section of data units, and the change to the second value signals the start of a new key period for the first decryption key. Effectively, the key message is used instead of data bits associated with the data units to signal changes between odd and even key periods pertaining to the first decryption key.

An embodiment includes subjecting at least part of at least some of the clear data units to a cryptographic operation employing a second encryption key, which forms a key pair with a corresponding second decryption key.

This has the effect of increasing the level of protection against so-called "control word piracy", a form of piracy in which an authorised receiver re-distributes the decryption keys to unauthorised receivers. The use of both a first and second encryption key increases the amount of key information that has to be re-distributed.

In an embodiment, the stream of data units is partitioned in sections corresponding to control word periods, at least part of at least one of the data units in each section corresponding to a control word period is obtained by subjecting at least part of a clear data unit to the cryptographic operation employing the second encryption key, wherein a different value of the second encryption key is used for each control word period, and wherein key information enabling an authorised decoder to obtain a value of the second decryption key corresponding to a value of the second encryption key used for a particular control word period is provided in one of the stream of key messages coinciding with a section preceding the section of the stream of data units corresponding to the particular control word period.

This has the effect of increasing the level of protection against control word piracy. Both the first and second decryption keys must be updated continuously.

In an embodiment, for each two consecutive control word periods, scrambling state identifying data including one of at least two values associated with the second decryption key is associated with each data unit obtained by subjecting at least part of a clear data unit to the cryptographic operation employing the second encryption key in a section of the stream of data units corresponding to a first of the two consecutive control word periods, and wherein scrambling state identifying data including a different one of the values associated with the second decryption key is associated with each data unit obtained by subjecting at least part of a clear data unit to the cryptographic operation employing the second encryption key in a section of the stream of data units corresponding to the second of the two consecutive control word periods.

This allows the definition of only four states, which are to be indicated in the scrambling state identifying data. A data unit can require no key, an odd second decryption key, an even second decryption key, or the current value of the first decryption key. In principle, two bits of scrambling state identifying data would suffice for signalling purposes. Although a "quiet period" is used for effecting a change in the first decryption key in a decoder, this is not required for the second decryption key. Thus, there is no need to suspend totally subjection of clear data units to a cryptographic algorithm.

In an embodiment, at least one key message in the stream of key messages carries key information enabling an authorised decoder to obtain a value of the first decryption key and a value of the second decryption key.

This is an efficient way of providing key information. It is particularly efficient where key messages are provided in a separately identified stream of data packets, such as in MPEG-2 transport streams. Only one packet identifier need be allocated to the data packets carrying key information for accessing the data units in a particular stream.

In an embodiment, each clear data unit is subjected to at most only one of the cryptographic operation employing the first encryption key and the cryptographic operation employing the second encryption key.

The effect is that there are no combined scrambling states, so that there are only four states to be indicated in the scrambling state identifying data.

In an embodiment, the stream of data units is provided as a multiplex of at least two streams of transport stream packets, each transport stream packet including a header and a payload, wherein each header includes a transport stream identifier, and wherein the identifier value associated with the first decryption key is constituted by a first value of the transport stream identifier.

This embodiment has the advantage of being compliant with existing standards for data broadcasting, such as the Digital Video Broadcasting standards, although it does require adaptation of decoders.

According to an example embodiment, the system for providing scrambled data is characterised in that the control system is arranged to suspend application of the cryptographic operation employing the first encryption key to any parts of clear data units in a third section of the stream of clear data corresponding to the third section of the stream of data units.

In an embodiment, the system is arranged to carry out a method of providing scrambled data according to an example embodiment.

A method of decoding scrambled data according to an example embodiment is characterized by, when a set of key information for generating a new value of the first decryption key differing from the current value of the first decryption key is obtained, causing replacement of the value of the first decryption key maintained as current value of the first decryption key by the new value of the first decryption key, and by subjecting at least parts of only data units associated with scrambling state identifying data including the first identifier value to the cryptographic operation employing the first decryption key.

By causing replacement of the value of the first decryption key maintained as current value of the first decryption key by the new value of the first decryption key when a set of key information for generating a new value of the first decryption key differing from the current value of the first decryption key is obtained, the method allows a provider of the scrambled data to indicate a change in the value of the first decryption key merely by providing a key message with the key information for obtaining the new value at a point coinciding with a section of the stream of data units that precedes the section of the stream of data units to which the new value applies. To ensure that data units in such a preceding section is not subjected to any cryptographic operation using the new value of the first decryption key, the provider can associate scrambling state identifying data including any identifier value but the first identifier value with the data units in the preceding section.

An embodiment includes subjecting at least parts of data units associated with scrambling state identifying data including any of at least one identifier value associated with a second decryption key and different from the first identifier value to a cryptographic operation employing the second decryption key.

Thus, more key information is required to access the data units in the stream, making control word piracy more difficult.

An embodiment includes obtaining a stream of data units which stream is partitioned into sections corresponding to control word periods, using a value of the second decryption key maintained as a current value of the second decryption key in the cryptographic operation employing the second decryption key, obtaining a new value of the second decryption key from key information in one of the stream of key messages, and replacing the current value of the second decryption by the new value of the second decryption key upon detecting a transition between control word periods, wherein the transition is detected by detecting a change from a first to a second identifier value associated with the second decryption key in the scrambling identifying data associated with data units in the sections of the stream of data units corresponding to the control word periods.

Thus, the method allows the provider of the stream of data units to cycle the value of the second decryption key continuously, whilst adding extra protection by requiring also the presence of the first decryption key.

In an embodiment, the second decryption key is obtained by obtaining a key message carrying encrypted key information and providing at least the encrypted key information to a secure decryption module arranged to return the second decryption key.

The secure decryption module can be a separate physical device, e.g. provided as a tamper-proof or tamper-evident device with an integrated circuit, such as a smart card. It may also be a software module within a decoder, made relatively tamper-proof, for example, by code obfuscation or other such techniques. This embodiment allows a separation of functions. Key information can be protected more closely than the stream of data units. The secure decryption module is provided with at least the encrypted key information from a decoder system. The secure decryption module has a higher level of security than the decoder system, due to protective features additional to those of the decoder system.

In an embodiment, a data unit is subjected to the cryptographic operation employing the first decryption key by providing at least part of that data unit to a secure decryption module and by providing the secure decryption module with at least one of the sets of key information in the key messages.

This has the advantage that the first decryption key can remain in the secure decryption module. Because parts of only data units associated with scrambling state identifying data including the first identifier value are subjected of the cryptographic operation employing the first decryption key, it is possible to have only some data units provided to the secure decryption module. Thus, the secure decryption module need not be dimensioned to process the entire stream of data units.

A system for decoding scrambled data according to an example embodiment is characterized in that the system is arranged, when a new value of the first decryption key differing from the current value of the first decryption key is obtained, to replace the value of the first decryption key maintained as current value of the first decryption key by the new value of the first decryption key and to apply the decryption operation using the first decryption key only to data in data units associated with scrambling state identifying data including the first identifier value.

In an embodiment, the system includes a decoder arranged to carry out a method of decoding scrambled data according to an example embodiment.

A computer program according to an example embodiment includes a set of instructions capable, when incorporated in a machine readable medium, of causing a system having information processing capabilities to perform a method of providing scrambled data or a method of decoding scrambled data according to an example embodiment.

A head-end system 1 in accordance with the Simulcrypt standard for Digital Video Broadcasting is schematically represented in FIG. 1. The head-end system 1 is but one example of a system for providing scrambled data. The head-end system 1 shown in FIG. 1 provides a stream of data packets that is broadcast. In other implementations of the methods of providing scrambled data, a stream of data units is written to a file on a data carrier such as a Digital Versatile Disk (DVD) or Compact Disk. Whereas the head-end system is typically employed to broadcast transport stream packets in accordance with the MPEG-2 systems standards (International Standard ISO/IEC 13818-1) via a terrestrial, satellite or cable broadcast system, the methods outlined herein may also be employed to provide scrambled data in Internet Protocol (IP) packets for broadcasting, multicasting or point-to-point communication to receivers in a suitable network.

The head-end system 1 includes a storage system 2 arranged to provide one or more elementary streams of content data belonging to a program. These elementary streams comprise components such as the video and audio elements of the program. A program in this context is a collection of data streams. Those of the data streams provided with a time base have a common time base and are intended for synchronised presentation as indicated by timing information in the elementary streams.

A multiplexing system 3 performs time multiplexing of input data and provides an MPEG-2 transport stream as output. The MPEG-2 transport stream is formed by a sequence of Transport Stream packets (TS packets) having a header and a payload, the payload carrying units of data from a particular elementary stream.

Besides the elementary streams from the storage system 2, the multiplexing system 3 receives Program Specific Information (PSI) from a PSI generator 4, a stream of Entitlement Control Messages (ECMs) from an ECM generator 5 and a stream of Entitlement Management Messages (EMMs) from an EMM generator 6. A provider of Conditional Access (CA provider) operates a custom PSI generator 7, which provides program specific information to the PSI generator 4. The systems (not shown) of several CA providers may be included in the head-end system 1, for which reason both the PSI generator 4 and the custom PSI generator 7 are present. The illustrated systems associated with one CA provider include the custom PSI generator 7, the ECM generator 5 and the EMM generator 6.

The head-end system 1 further includes a CW generator 8 for generating a sequence of encryption keys, referred to herein as second encryption keys or control words. A network management system 9 controls the operation of the various components.

Control words generated by the CW generator 8 are provided to a synchronisation system 10. The synchronisation system 10 provides the control words to the ECM generator 5, receiving the ECMs in return. Each ECM includes at least one set of key information enabling an authorised decoder to obtain a control word from it. Zone Name: A3,AMD,M The synchronization system 10 also provides the control words to a scrambling system 11, which scrambles the MPEG-2 transport stream obtained as output from the multiplexing system 3. One function performed by the synchronisation system 10 is to synchronise the stream of ECMs with the scrambled MPEG-2 transport stream. Synchronisation is preferably effected by means of time stamps in the MPEG-2 TS packets, thereby providing the TS packets carrying the ECMs and the scrambled TS packets with a common time base. Synchronisation may be effected by the order in which the streams of TS packets carrying the ECMs and the scrambled TS packets are multiplexed, in combination with a system for maintaining the order of TS packets in the multiplex. It is observed that, in other embodiments the key messages are played out over a separate channel, and that a reference time is used to synchronise the stream of key messages with the stream of scrambled data units.

In the illustrated implementation, the ECMs carry data representative of the control words and encrypted under a session key. The ECM generator 5 obtains the session key from the EMM generator 6, which includes the session keys in EMMs addressed to subscribers or groups of subscribers. The EMMs are sent to subscribers in a known manner in the MPEG-2 transport stream produced by the multiplexing system 3.

Figure 2:
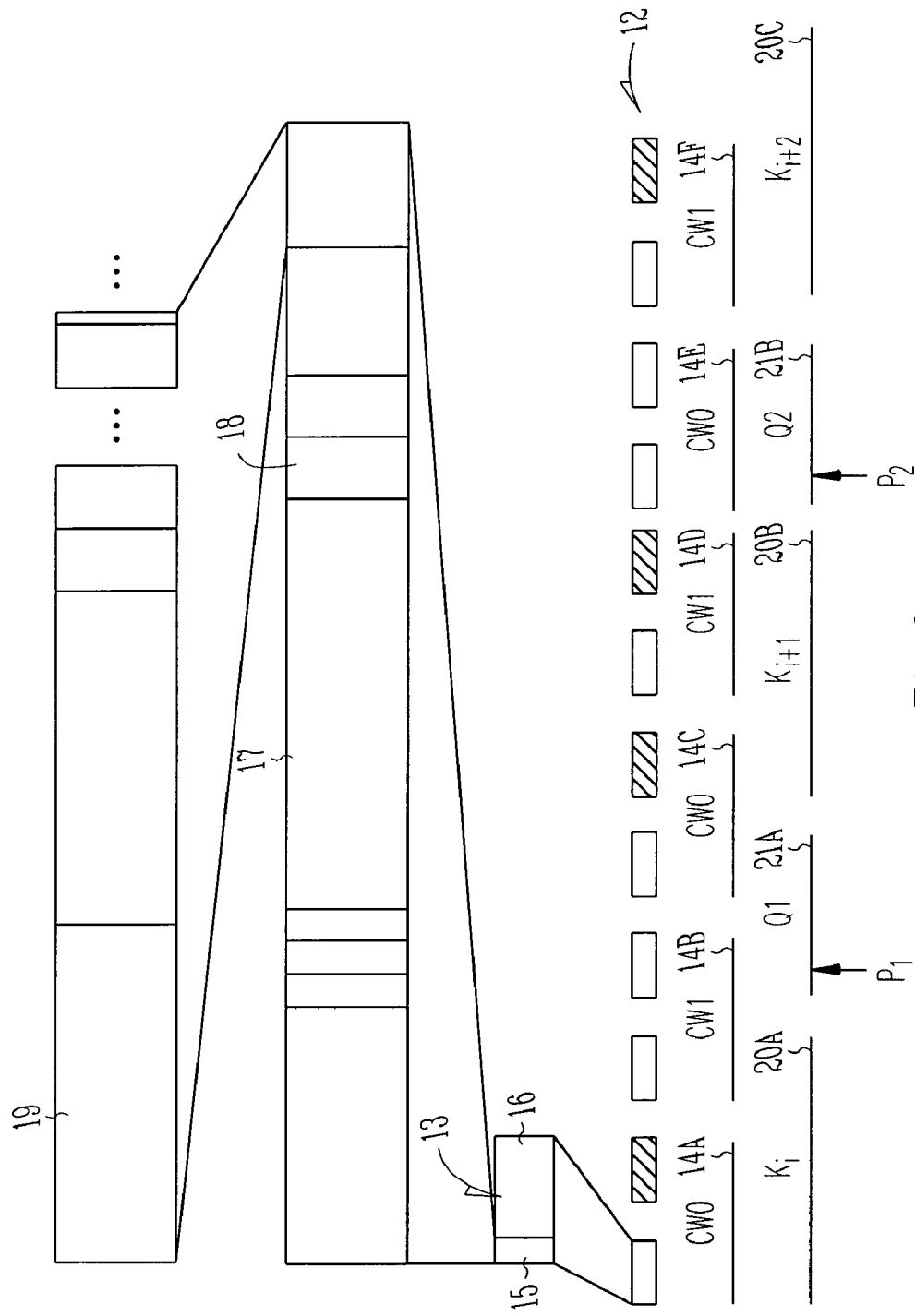
FIG. 2 is a diagram showing part of a hypothetical stream of transport stream packets to illustrate a first embodiment of an example embodiment.

A first stream 12 of scrambled TS packets 13 as generated by a system comprising the synchronisation system 10 and the scrambling system 11 is illustrated in FIG. 2. The first stream 12 is partitioned into sections corresponding to control word periods 14a-14f. For clarity of illustration, each section corresponding to a control word period 14 is constituted by two TS packets 13 in the example. The number of TS packets 13 per control word period 14 will be a higher in a practical implementation.

Each TS packet 13 has a header 15 and a payload 16. Only the payload 16 of any TS packet 13 is scrambled. Except where relevant to the present description, fields in the header are not described herein in detail. The full composition of the header 15 is known from international standard ISO/IEC 13818-1. A packet identifier (PID) field 17 contains a unique number used to identify elementary streams of a single or multi-program Transport stream. The ECMs are carried in TS packets 13 with their own unique PID value. A program map table generated by the custom PSI generator 7 and/or PSI generator 4 links this PID value to the PID values for the elementary streams that have been scrambled using the keys for which those ECMs carry the key information.

The header 15 further includes scrambling state identifying data in the form of a transport scrambling control field 18. The transport scrambling control field 18 is two bits in size.

The header 15 further includes a Program Clock Reference (PCR) field 19. The PCR field 19 indicates the intended time of arrival of an agreed upon byte of the TS packet 13. In one embodiment, the PCR field 19 is used to synchronise the stream of ECMs with the first stream 12 of TS packets, providing the two streams with a common time base. In this way, an ECM can coincide with one of the control word periods 14 even though it is actually obtained by a decoder before any of the TS packets 13 in the section of the first stream 12 corresponding to that control word period 14.

In FIG. 2, the payloads 16 of TS packets 13 in the first stream 12 without shading have been scrambled by subjecting them to cryptographic operation employing the control word. A different value of the control word is used for each control word period 14. The control word periods 14 can be regarded as alternating odd control word periods 14a,14c,14e and even control word periods 14b,14d,14f. In all embodiments discussed herein, those TS packets 13 obtained by subjecting at least part of a corresponding clear TS packet's payload 16 to scrambling under the control word have one of the values "10" and "11" in the transport scrambling control field 18. The value "10" applies to even control word periods 14b,14d, 14f. The value "11" applies to odd control word periods 14a,14c,14e. Thus, a change between the two values in the transport scrambling control field 18 identifies a transition from one control word period to the next.

The stream of ECMs is configured such that at least one ECM coincides with each control word period 14. That ECM, or those ECMs, carries at least key information enabling an authorised decoder to obtain the value of the control word valid during the control word period 14 following the one with which it coincides. Optionally, it may also include the value of the control word valid during the control word period 14 with which it coincides. In that case, identifiers associating the key information with the appropriate one of the consecutive control word periods are provided with the sets of key information.

In the embodiment illustrated, selected ones of the TS packets 13 in the first stream are obtained by subjecting at least part of a clear packet payload 16 to a so-called layer 1 cryptographic operation employing a layer 1 encryption key. In FIG. 2, such TS packets 13 are illustrated by means of shading. One can identify discrete sections within the first stream 12 corresponding to layer 1 key periods 20a,20b,20c. The sections corresponding to the layer 1 key periods 20 are not contiguous, but separated by sections corresponding to so-called "quiet periods" 21a,21b. The sections corresponding to layer 1 key periods 20 and quiet periods 21 form a complete partitioning of the first stream 12, in parallel to the partitioning into sections corresponding to control word periods 14.

Within each layer 1 key period 20, TS packet payloads 16 are selected at a pre-determined rate for encryption under a value of the layer 1 encryption key associated with that layer 1 key period. During the quiet periods 21, this operation is suspended until the start of the next layer 1 key period. Within each section of the first stream 12 corresponding to a layer 1 key period 20, those TS packets 13 obtained as a result of applying the cryptographic operation employing the layer 1 encryption key include the value "01" in the transport scrambling control field 18.

For each control word period 14, at least one ECM coinciding with that control word period 14 includes also key information for obtaining the value of the layer 1 decryption key valid for one of the next control word period 14 and the next layer 1 key period, depending on the embodiment.

The cryptographic operation employing the layer 1 encryption key varies according to the chosen implementation. In one embodiment, the cryptographic operation involves a cipher in block chaining mode, wherein the packet payload 16 is partitioned into blocks of equal size, e.g. eight or sixteen bytes, and only a first of a sequence of blocks is encrypted under the layer 1 encryption key. The AES algorithm provides a suitable cipher for use in block chaining mode. Since each TS packet 13 is part also of a section corresponding to a control word period 14, the relevant control word can, for example, be used as encryption key for the other blocks. Thus, both the layer 1 decryption key and a control word are required to descramble such a TS packet 13. In another embodiment, a section of the packet's payload 16 carries a further key encrypted under the layer 1 encryption key and the remaining part of the payload 16 is encrypted under the further key.

In the embodiment illustrated in FIG. 2, the first ECM with the layer 1 decryption key for a second layer 1 key period 20b is published at a point $P_1$ coinciding with a first quiet period 21a preceding the second layer 1 key period 20b. The first ECM with the layer 1 key for a third layer 1 key period 20c is published at a point $P_2$ coinciding with a second quiet period 21b immediately preceding the third layer 1 key period 20c. The effect is that a decoder can immediately start loading the next layer 1 decryption key. In another embodiment, the first ECM with the layer 1 decryption key for a particular layer 1 key period coincides with the previous layer 1 key period. For the decoder to function properly, it must detect that a change in the key information has occurred, and it must detect the boundaries between the first quiet period 21a and the second layer 1 key period 20b. This it can do by detecting that TS packets 13 with value "01" in the transport scrambling control field 18 are not appearing at an expected rate, for example.

All embodiments have in common that both the control word and the layer 1 key values are cycled, but that only two bits of scrambling state identifying information are required to synchronise the key changes with the key messages. The use of two keys means that the amount of key information needed to descramble the first stream 12 is relatively large. As illustrated, the control word periods 14 and layer 1 key periods 20 are of different lengths. A section of the first stream 12 corresponding to a layer 1 key period comprises more TS packets 13 than a section corresponding to a control word period 14. That is to say that the layer 1 key is cycled at a lower rate than the control word.

Figure 3:
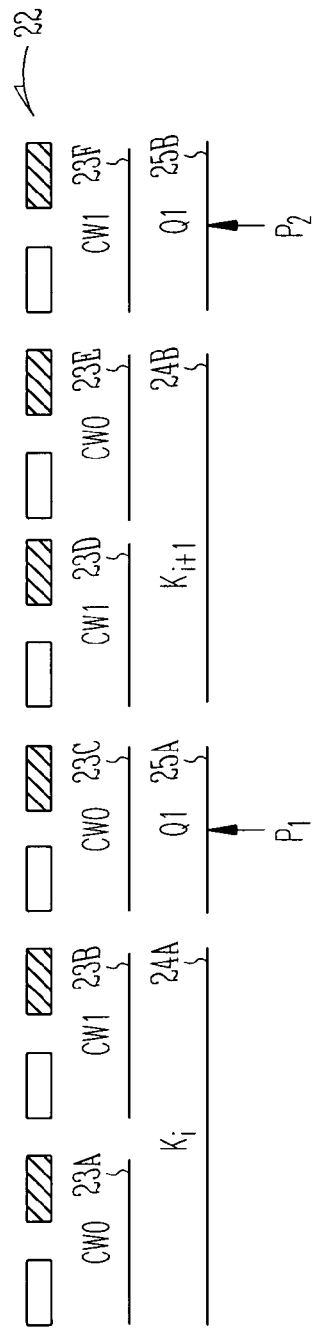
FIG. 3 is a diagram showing part of a hypothetical stream of transport stream packets to illustrate a second embodiment of an example embodiment.

FIG. 3 illustrates a variant of the method illustrated in FIG. 2. A second stream 22 of TS packets 13 is partitioned into sections corresponding to control word periods 23, and also into sections corresponding to alternating layer 1 key periods 24 and quiet periods 25. Shaded TS packets 13 are identifiable by means of the value "01" in the transport scrambling control field 18. These packets have been obtained by subjecting at least part of a clear packet payload 16 to a cryptographic operation involving at least a current value of the layer 1 encryption key. A different value is used in each layer 1 key period. The new value for the corresponding layer 1 decryption key is sent in an ECM coinciding with the section of the second stream 22 corresponding to the quiet period 25 preceding the layer 1 key period 24 to which it is applicable. The embodiment illustrated in FIG. 3 differs from that illustrated in FIG. 2, in that transitions between quiet periods 25 and layer 1 key periods 24 coincide with transitions between control word periods 23. An effect is that a decoder can determine the start and end of a layer 1 key periods by counting down a pre-determined or separately communicated number of control word periods 23. Otherwise, what has been stated above with regard to the embodiment of FIG. 2 applies equally to that illustrated in FIG. 3. In particular, insertion points $P_1$, $P_2$ coincide with sections of the second stream 22 corresponding to quiet periods 25 immediately preceding sections corresponding to layer 1 key periods 24. A first ECM carrying key information for obtaining a new value of the layer 1 key is transmitted at the insertion point $P_1, P_2$.

Figure 4:
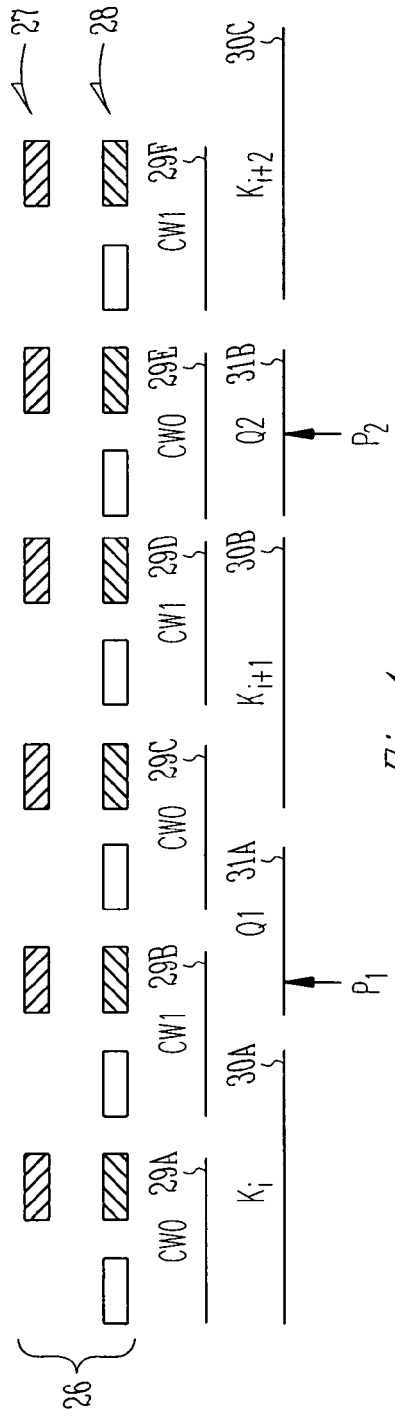
FIG. 4 is a diagram showing part of a hypothetical stream of transport stream packets to illustrate a third embodiment of an example embodiment.

FIG. 4 illustrates another embodiment in which two layers of encryption are applied. In this case, a third scrambled data stream 26 is provided as a multiplex of at least two streams of TS packets 13. Those TS packets 13 obtained by subjecting a clear data packet payload 16 to the cryptographic operation employing the layer 1 encryption key form a first component stream 27, identified by a unique value of the PID field 17. A second component stream 28—itself also a multiplex of elementary streams of TS packets 13 with different values of the PID field 17, just like the first stream 12 and second stream 22 of FIGS. 2 and 3—includes only TS packets 13 with values in the PID field 17 different from the value or values identifying the TS packets 13 in the first component stream 27.

In FIG. 4, the third scrambled data stream 26 can be thought of as partitioned into sections corresponding to odd and even control word periods 29. Those TS packets in the second component stream 28 which have been scrambled only by applying a cryptographic operation involving the control word are not shaded in the drawing. What has been stated above with regard to such TS packets 13 in the embodiments of FIGS. 2 and 3 applies equally to the embodiment of FIG. 4. In particular, they all have a transport scrambling control field with a value "10" or "11", depending on whether they are comprised in a section corresponding to an even or an odd control word period.

The second component stream 28 also includes "dummy packets". These may have a transport scrambling control field with a value "01", but preferably have the value "00", corresponding to an identifier value assigned to TS packets 13 which have not been scrambled at all. In this way, this embodiment is compliant with the existing syntax for MPEG-2 transport streams.

The "dummy packets" serve as placeholders for the TS packets in the first component stream 27, facilitating the reconstruction of the clear transport stream on the basis of which the third scrambled data stream 26 was generated. An embodiment in which the second component stream 28 does not include the "dummy packets" is also possible. In that case, a decoder must change the timing information when inserting clear TS packets 13 obtained by descrambling the first component stream 27 into the clear stream obtained by descrambling the second component stream 28.

As was the case for the first and second streams 12,22 of TS packets 13, the third stream 26 can be thought of as partitioned into alternating layer 1 key periods 30 and quiet periods 31. Points $P_1,P_2$ indicate where a new layer 1 decryption key is first published. These points $P_1,P_2$ coincide with the quiet periods 31.

Figure 5:
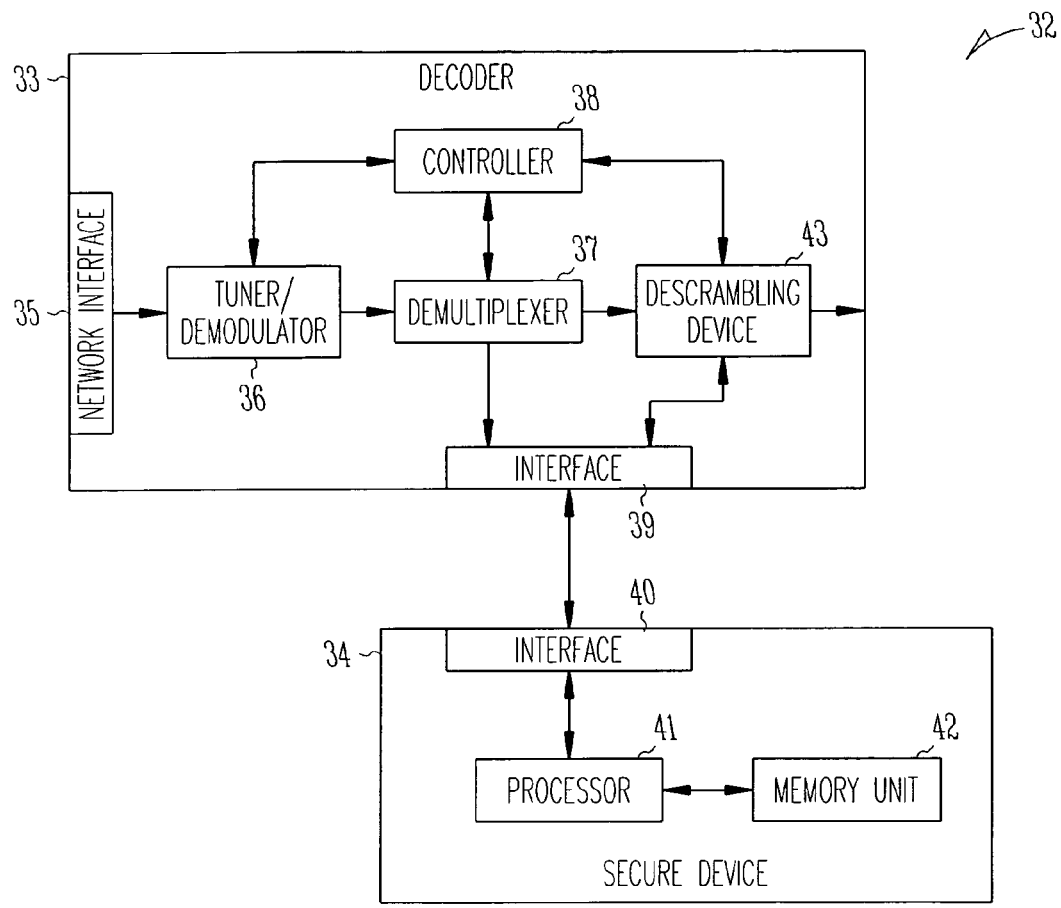
FIG. 5 is a schematic diagram of a system including a secure decryption module and a decoder.

An example of a receiver system 32 for decoding a stream obtained from the scrambling system 11 and broadcast over a network (not shown) is illustrated in FIG. 5. The receiver system 32 includes a decoder 33 and a portable secure device 34, e.g. a smart card. A tamper-proof software module may be installed in the decoder 33 instead of the detachable secure device 34 to provide the equivalent functionality.

The decoder 33 receives the scrambled data stream and stream of ECMs through a network interface 35 and tuner/demodulator 36. A demultiplexer 37 filters out the TS packets 13 belonging to a program as directed by a controller 38. As is known, a program map table in the stream of TS packets 13 contains the PID values in the PID field 17 in the headers 15 of the required TS packets 13. In this way, the stream of ECMs and stream or streams of scrambled TS packets 13 are obtained.

The ECMs are passed to the detachable secure device 34 through an interface 39 of the decoder and an interface 40 of the detachable secure device 34. A processor 41 in the detachable secure device 34 decrypts the key information contained in the ECMs to obtain the control words and layer 1 decryption keys. The detachable secure device 34 further includes a memory unit 42 for storing keys.

Control words are returned to the decoder 33 via the interfaces 39,40 in a known manner and passed to a descrambling device 43. The descrambling device 43 decrypts the payload 16 of all TS packets 13 containing the values "10" and "1" in the transport scrambling control field 18 under the control word.

In one embodiment, the decoder 33 passes TS packets 13 obtained by subjecting at least part of the payload 16 of a corresponding clear TS packet 13 to a cryptographic operation employing the layer 1 encryption key to the detachable secure device 34. The detachable secure device 34 performs the inverse cryptographic operation employing the corresponding layer 1 decryption key—it keeps this key available the memory unit 42- and returns the resultant TS packet 13 to the decoder 33, which inserts it into the stream at the position from which it was taken. The TS packets to be provided to the detachable secure device 34 are identified by the value "01" in the transport scrambling control field 18 where the stream has one of the format discussed above with reference to FIGS. 2 and 3.

In a variant, only a section of the payload 16 of each TS packet 13 associated with scrambling state identifying information including the identifier associated with the layer 1 key is provided to the detachable secure device 34. This section is subjected to a cryptographic operation under the layer 1 decryption key. A result of the cryptographic operation is returned to the descrambling device 43, which subjects at least one section of the same payload 16 to a cryptographic operation in dependence on the result obtained from the detachable secure device. The effect is that the detachable secure device 34 functions as an access token without necessarily having to carry out a large amount of processing on the TS packets 13. The TS packets 13 nevertheless remain relatively secure. In one embodiment, the result obtained from the detachable secure device 34 is used as a key in a decryption operation on at least one further section of the TS packet's payload 16. In another embodiment, the result is the first block of the clear payload 16, and a cryptographic cipher in block chaining mode is employed to render the complete clear payload 16. The first block is used as initialisation vector. In such an embodiment, the layer 1 decryption key is also provided to the descrambling device 43, and used in the cipher on the remaining blocks. In another variant, a value derived from the layer 1 decryption key, but different from it, is provided to the descrambling device 43. In yet another variant, the descrambling device 43 uses the control word valid for the control word period corresponding to the section from which the TS packet 13 was taken as the decryption key in the cipher.

The ECM carrying the key information for obtaining the layer 1 decryption key is processed upon arrival. When a new value of the layer 1 decryption key is obtained, the value of the layer 1 decryption key previously maintained as current value is immediately replaced by the new value and applied to the next TS packet 13 requiring the use of the layer 1 decryption key. In one embodiment, each value of the layer 1 decryption key obtained from an ECM is loaded into the memory unit 42 of the detachable secure device—and in some embodiments provided to the decoder 33—without any check. In another embodiment, it is only applied if it differs from the value maintained as current value. This has the effect of limiting the number of key transfers between the decoder 33 and detachable secure device 34 in embodiments where the decoder 33 uses the layer 1 key. In other embodiments it merely limits the number of transfers of information to and from the memory unit 42.

In case the stream obtained by the decoder 33 has the format illustrated in FIG. 4, then a filter is set up for the PID value corresponding to the first component stream 27. The payloads 16 of those TS packets 13 belonging to the first component stream 27 are subjected to a decryption operation involving the layer 1 decryption key. This involves one of the operations described above with reference to FIGS. 2-3 and 5. The decoder 33 descrambles the first and second component streams 27,28 separately. Then, using a FIFO (first-in-first-out) buffer (not shown), the "dummy packets" are replaced by clear TS packets 13 obtained as a result of applying the decryption operation employing the layer 1 decryption key. The PID values are adjusted so that the stream leaving the FIFO buffer contains one less PID value.

As mentioned, the decoder 33 does detect the PID value associated with TS packets 13 to be subjected to a cryptographic operation employing the layer 1 decryption key, but does not receive a data stream with double illuminated TS packets 13 in a variant. In that case, clear TS packets 13 obtained from the TS packets 13 with that particular PID value are re-mapped into a second component stream of the multiplex that forms the scrambled data stream.

An example embodiment is not limited to the embodiments described herein in detail, but may be varied within the scope of the accompanying claims. For instance, the cryptographic operation employing a layer 1 encryption key may involve the generation and attachment of a digital signature to a TS packet payload, instead of encryption of the actual payload. As is known, the signature generation process applies a one-way function to part or all of the packet payload and encrypts the result, in such case under the layer 1 encryption key. The corresponding decryption operation involves decryption of the signature under a layer 1 decryption key forming a key pair with the layer 1 encryption key.

It is further observed that the stream of key messages is multiplexed to form part of the stream of scrambled TS packets in most implementations. In such embodiments, a key message will coincide with a particular section of the stream of scrambled TS packets by being part of that section or by containing timing or continuity information linking it to that section.

What is claimed is:

1. A method in a head-end system of providing scrambled data, comprising:
   providing a stream of data units based on a sequence of clear data units originating from a storage system by at least subjecting at least part of at least some of the clear data units to a cryptographic operation in a scrambling system employing a first encryption key from a control word generator which forms a key pair with a corresponding first decryption key, such that a first section of the stream of data units includes data units including cryptograms obtained by the scrambling system using a first value of the first encryption key, and such that a second section includes data units including cryptograms obtained by the scrambling system using a second value of the first encryption key,
   associating, by the scrambling system, data units with a plurality of scrambling control bits from a program specific information generator for indicating a first, second, third, or fourth state of scrambling applicable to the associated data unit,
   providing a stream of key messages from an ECM generator, each carrying at least key information enabling an authorised decoder to obtain a value of the first decryption key, the stream of key messages and stream of data units being synchronised by a synchronisation system,
   associating in the scrambling system each data unit including a cryptogram obtained using any value of the first encryption key with scrambling control bits indicating a first state of scrambling, said first state associated with the first decryption key,
   associating in the scrambling system data units in a third section, separating the first and second sections, with scrambling control bits indicating one of: a second, third, and fourth states of scrambling,
   providing from the scrambling system in at least one key message coinciding with one of the first and third sections key information enabling an authorised decoder to obtain a value of the first decryption key corresponding with the second value of the first encryption key, and
   suspending subjection of at least part of the clear data units to the cryptographic operation in the scrambling system employing the first encryption key for each data unit in the sequence included in the third section;
   subjecting at least part of at least some of the clear data units in the third section to a cryptographic operation in the scrambling system employing a second encryption key from a control word generator, which forms a key pair with a corresponding second decryption key;
   wherein key information enabling an authorised decoder to obtain a value of the second decryption key corresponding to a value of the second encryption key used for a particular control word period is provided in one of the stream of key messages coinciding with a section preceding the section of the stream of data units corresponding to the particular control word period;
   wherein, for each two consecutive control word periods:
      scrambling control bits indicating the third state of scrambling, said third state associated with the second decryption key is associated by the scrambling system with each data unit obtained by subjecting at least part of a clear data unit to the cryptographic operation in the scrambling system employing a first value of the second encryption key in a section of the stream of data units corresponding to a first of the two consecutive control word periods, and
      scrambling control bits indicating the fourth state of scrambling, said fourth state associated with the second decryption key is associated with each data unit obtained by subjecting at least part of a clear data unit to the cryptographic operation employing a second value of the second encryption key in a section of the stream of data units corresponding to the second of the two consecutive control word periods.

2. A method according to claim 1, wherein at least one key message in the stream of key messages carries key information enabling an authorised decoder to obtain a value of the first decryption key and a value of the second decryption key.

3. A method according to claim 1, wherein each clear data unit is subjected to at most only one of the cryptographic operation in the scrambling system employing the first encryption key and the cryptographic operation in the scrambling system employing the second encryption key.

4. A method according to claim 1, wherein the stream of data units is provided by a multiplexer as a multiplex of at least two streams of transport stream packets, each transport stream packet including a header and a payload, wherein each header includes a transport stream identifier, and wherein the identifier value associated with the first decryption key is constituted by a first value of the transport stream identifier.

5. A head-end system for providing scrambled data, including
   a scrambling system for providing a stream of data units based on a sequence of clear data units originating from a storage system by at least subjecting at least part of at least some of the clear data units to a cryptographic operation in a scrambling system employing a first encryption key from a control word generator which forms a key pair with a corresponding first decryption key, such that a first section of the stream of data units includes data units including cryptograms obtained by the scrambling system using a first value of the first encryption key, and such that a second section includes data units including cryptograms obtained by the scrambling system using a second value of the first encryption key;
   a first system for:
      associating data units with a plurality of scrambling control bits from a program specific information generator for indicating a first, second, third, or fourth states of scrambling applicable to the associated data unit;

associating each data unit including a cryptogram obtained using any value of the first encryption key with scrambling control bits indicating a first state of scrambling, said first state associated with the first decryption key;

associating data units in a third section, separating the first and second sections, with scrambling control bits indicating one of: a second, third, and fourth states of scrambling, a key message system for:

providing a stream of key messages from an ECM generator, each carrying at least key information enabling an authorised decoder to obtain a value of the first decryption key, the stream of key messages and stream of data units being synchronised by a synchronisation system, providing in at least one key message coinciding with one of the first and third sections key information enabling an authorised decoder to obtain a value of the first decryption key corresponding with the second value of the first encryption key, and the scrambling system further configured for:

suspending subjection of at least part of the clear data units to the cryptographic operation in the scrambling system employing the first encryption key for each data unit in the sequence included in the third section;

subjecting at least part of at least some of the clear data units in the third section to a cryptographic operation employing a second encryption key from a control word generator, which forms a key pair with a corresponding second decryption key;

wherein key information enabling an authorised decoder to obtain a value of the second decryption key corresponding to a value of the second encryption key used for a particular control word period is provided in one of the stream of key messages coinciding with a section preceding the section of the stream of data units corresponding to the particular control word period;

wherein, for each two consecutive control word periods:

scrambling control bits indicating the third state of scrambling, said third state associated with the second decryption key is associated by the scrambling system with each data unit obtained by subjecting at least part of a clear data unit to the cryptographic operation in the scrambling system employing a first value of the second encryption key in a section of the stream of data units corresponding to a first of the two consecutive control word periods, and scrambling control bits indicating the fourth state of scrambling, said fourth state associated with the second decryption key is associated with each data unit obtained by subjecting at least part of a clear data unit to the cryptographic operation employing a second value of the second encryption key in a section of the stream of data units corresponding to the second of the two consecutive control word periods.

6. A method in a receiver system of decoding scrambled data, comprising:

obtaining via a network interface a stream of data units, a plurality of data units in the stream being associated with a plurality of scrambling control bits for indicating a first, second, third, or fourth state of scrambling applicable to the associated data unit, obtaining via the network interface a stream of key messages in synchronisation with the stream of data units, causing consecutive values of a first decryption key to be generated by a processor from respective sets of key information in at least some of the key messages in the stream of key messages, and subjecting at least a part of any data unit associated with scrambling control bits indicating the first state of scrambling associated with the first decryption key to a cryptographic operation in a descrambling device employing the first decryption key, wherein a value of the first decryption key maintained in a memory unit as a current value is applied, wherein when a set of key information for generating a new value of the first decryption key differing from the current value of the first decryption key is obtained by the processor, causing replacement in the memory unit of the value of the first decryption key maintained as current value of the first decryption key by the new value of the first decryption key, and subjecting at least parts of only data units associated with scrambling control bits indicating the first state of scrambling to the cryptographic operation in the descrambling device employing the value of the first decryption key as maintained by the memory unit;

subjecting at least parts of data units associated with scrambling control bits indicating the third or fourth state of scrambling to a cryptographic operation in the descrambling device employing the second decryption key by using a value of the second decryption key maintained as a current value of the second decryption key in the cryptographic operation by the descrambling device employing the second decryption key;

obtaining via the network interface a stream of data units which stream is partitioned into sections corresponding to control word periods, obtaining by the processor a new value of the second decryption key from key information in one of the stream of key messages, and replacing in the memory unit the current value of the second decryption by the new value of the second decryption key upon detecting a transition between control word periods, wherein the transition is detected by the processor by detecting a change from the third to the fourth state of scrambling, the third and fourth states associated with the second decryption key in the scrambling control bits associated with data units in the sections of the stream of data units corresponding to the control word periods.

7. A method according to claim 6, wherein the second decryption key is obtained by obtaining a key message carrying encrypted key information and providing at least the encrypted key information to a secure decryption module comprising the processor arranged to return the second decryption key.

8. A method according to claim 6, wherein a data unit is subjected to the cryptographic operation in the descrambling device employing the first decryption key by providing at least part of that data unit to a secure decryption module comprising the processor and by providing the secure decryption module with at least one of the sets of key information in the key messages.

9. A system for decoding scrambled data, comprising:

an interface for obtaining a stream of data units, a plurality of data units in the stream being associated with scrambling control bits for indicating a first, second, third, or fourth state of scrambling applicable to the associated data unit, and for obtaining a stream of key messages synchronously with the stream of data units, wherein the system comprises a processor to obtain consecutive values of a first decryption key from respective sets of key information in at least some of the key messages in the stream of key messages, and wherein the system further comprises a descrambling device to apply a decryption operation to at least parts of data units associated with scrambling control bits indicating the first state of scrambling associated with the first decryption key using the first decryption key, wherein a value of the first decryption key maintained in a memory unit as a current value is applied, and wherein the system is arranged, when a new value of the first decryption key differing from the current value of the first decryption key is obtained by the processor, to replace the value of the first decryption key maintained in the memory unit as current value of the first decryption key by the new value of the first decryption key and to apply the decryption operation using the value of the first decryption key as maintained by the memory unit only to data in data units associated with scrambling control bits state indicating the first state of scrambling;

the descrambling device further configured for subjecting at least parts of data unit associated with scrambling control bits indicating the third or fourth state of scrambling, said data units is partitioned into sections corresponding to control word periods, to a cryptographic operation employing the second decryption key by using a value of the second decryption key maintained as a current value of the second decryption key in the cryptographic operation by the descrambling device employing the second decryption key;

obtaining by the processor a new value of the second decryption key from key information in one of the stream of key messages, and replacing in the memory unit the current value of the second decryption by the new value of the second decryption key upon detecting a transition between control word periods, wherein the transition is detected by the processor by detecting a change from the third to the fourth state of scrambling, the third and fourth states associated with the second decryption key in the scrambling control bits associated with data units in the sections of the stream of data units corresponding to the control word periods.

* * * * *